United States Patent
Huang et al.

(10) Patent No.: US 10,802,900 B2
(45) Date of Patent: Oct. 13, 2020

(54) COMPUTE NODE, FAILURE DETECTION METHOD THEREOF AND CLOUD DATA PROCESSING SYSTEM

(71) Applicant: Industrial Technology Research Institute, Hsinchu (TW)

(72) Inventors: Chun-Chieh Huang, Taoyuan (TW); Tzu-Chia Wang, New Taipei (TW)

(73) Assignee: Industrial Technology Research Institute, Hsinchu (TW)

(*) Notice: Subject to any disclaimer, the term of this patent is extended or adjusted under 35 U.S.C. 154(b) by 101 days.

(21) Appl. No.: 16/244,106

(22) Filed: Jan. 10, 2019

(65) Prior Publication Data
US 2020/0057686 A1  Feb. 20, 2020

(30) Foreign Application Priority Data
Aug. 14, 2018 (TW) ................. 107128364 A

(51) Int. Cl.
*G06F 11/07* (2006.01)
*G06F 11/20* (2006.01)

(52) U.S. Cl.
CPC ...... *G06F 11/0709* (2013.01); *G06F 11/0757* (2013.01); *G06F 11/2025* (2013.01)

(58) Field of Classification Search
CPC ............ G06F 11/0709; G06F 11/0712; G06F 11/0757; G06F 11/0754; G06F 11/076;
(Continued)

(56) References Cited

U.S. PATENT DOCUMENTS 5,894,583 A * 4/1999 Johnson .............. G06F 11/0757
710/260
9,280,380 B2  3/2016 Tsirkin
(Continued)

FOREIGN PATENT DOCUMENTS

| CN | 106230986 | 12/2016 |
|---|---|---|
| CN | 106796540 | 5/2017 |

(Continued)

OTHER PUBLICATIONS

Yoji Yamato et al.,"Fast and reliable restoration method of virtual resources on OpenStack," IEEE Transactions on Cloud Computing, Sep. 25, 2015, pp. 1-12.
(Continued)

*Primary Examiner* — Gabriel Chu
(74) *Attorney, Agent, or Firm* — JCIPRNET

(57) ABSTRACT

A compute node, a failure detection method thereof and a cloud data processing system are provided. The method is adapted to the cloud data processing system having a plurality of compute nodes and at least one management node, and includes following steps: performing a self-inspection on operating statuses of services being provided and resource usage statuses, and reporting an inspection result to the management node by each compute node; dynamically adjusting a time interval of a next report and informing the management node of the time interval by the compute node; and checking a report condition of the inspection result according to the time interval by the management node, so as to determine whether the compute node fails.

20 Claims, 10 Drawing Sheets

(58) Field of Classification Search
CPC ............. G06F 11/0766; G06F 11/0781; G06F 11/0793; G06F 11/20; G06F 11/202; G06F 11/2023; G06F 11/2025; G06F 11/2028; G06F 11/203; G06F 11/3006; G06F 11/301; G06F 11/3072; G06F 11/3065; H04L 43/10; H04L 43/103; H04L 43/06; H04L 43/065; H04L 43/067; H04L 43/08; H04L 43/0805; H04L 43/0817; H04L 43/16

See application file for complete search history.

(56) References Cited

U.S. PATENT DOCUMENTS

| | | | |
|---|---|---|---|
| 9,465,704 B2 | 10/2016 | Ganesan et al. | |
| 9,558,082 B2 | 1/2017 | Antony et al. | |
| 9,990,220 B2 | 6/2018 | Vavrick et al. | |
| 2002/0083169 A1* | 6/2002 | Aki | H04L 43/00 709/224 |
| 2003/0225880 A1* | 12/2003 | Srivastava | G06F 11/326 709/224 |
| 2006/0294221 A1* | 12/2006 | Graupner | H04L 43/067 709/224 |
| 2007/0038744 A1* | 2/2007 | Cocks | H04L 43/0817 709/224 |
| 2007/0078976 A1* | 4/2007 | Taylor | G03G 15/5075 709/224 |
| 2007/0112954 A1* | 5/2007 | Ramani | H04L 67/14 709/224 |
| 2007/0198679 A1* | 8/2007 | Duyanovich | G06F 11/3452 709/223 |
| 2008/0082142 A1* | 4/2008 | Clark | G06F 11/0757 607/60 |
| 2010/0127881 A1* | 5/2010 | Schechter | H04L 67/12 340/584 |
| 2014/0304394 A1* | 10/2014 | A | H04L 67/2852 709/224 |
| 2015/0293823 A1 | 10/2015 | Bu | |
| 2019/0036772 A1* | 1/2019 | Agerstam | H04W 4/70 |

FOREIGN PATENT DOCUMENTS

| | | |
|---|---|---|
| CN | 105389243 | 6/2018 |
| TW | 200907702 | 2/2009 |
| TW | 201738747 | 11/2017 |

OTHER PUBLICATIONS

Renyu Yang et al., "Reliable Computing Service in Massive-scale Systems through Rapid Low-cost Failover," IEEE Transactions on Services Computing, Jan. 2016, pp. 1-13.

Valentina Salapura et al., "ResilientVM: high performance virtual machine recovery in the cloud," AIMC '15 Proceedings of the 1st International Workshop on Automated Incident Management in Cloudp , Apr. 21, 2015, pp. 7-12.

Jielong Xu et al., "Enhancing Survivability in Virtualized Data Centers: A Service-Aware Approach," IEEE Journal on Selected Areas in Communications, vol. 31, No. 12, Dec. 2, 2013, pp. 2610-2619.

Balazs Gerofi et al., "Enhancing TCP throughput of highly available virtual machines via speculative communication," VEE '12 Proceedings of the 8th ACM SIGPLAN/SIGOPS conference on Virtual Execution Environments, Mar. 2012 , pp. 87-96.

Ardalan Kangarlou et al., "In-network live snapshot service for recovering virtual infrastructures," IEEE Network, vol. 25, No. 4, Jul./Aug. 2011, pp. 12-19.

\* cited by examiner

COMPUTE NODE, FAILURE DETECTION METHOD THEREOF AND CLOUD DATA PROCESSING SYSTEM

CROSS-REFERENCE TO RELATED APPLICATION

This application claims the priority benefit of Taiwan application no. 107128364, filed on Aug. 14, 2018. The entirety of the above-mentioned patent application is hereby incorporated by reference herein and made a part of this specification.

TECHNICAL FIELD

The disclosure relates to a cloud data processing method and a system using the same, and more particularly, to a compute node, a failure detection method thereof and a cloud data processing system.

BACKGROUND

When a compute node on a cloud data center is affected by unpredictable environmental factors or irresistible external forces, a virtual machine running on the compute node may not be able to provide normal application services, which in turn will damage the operational rights of legitimate users of the virtual machine. For allowing the virtual machine running on the failed compute node to function properly, the affected virtual machine needs to be evacuated from the failed compute node to other compute nodes (compute nodes other than the failed compute node) that function properly.

For example, a HA (High Availability) cluster is composed of one or more active nodes accompanied with zero or more standby nodes, and has a number of cluster members being at least 2. Operations of the HA cluster are applicable to a plurality of physical machines (PM). When one physical machine running the virtual machine (VM) work tasks fails, the HA cluster can support a virtual machine evacuation to evacuate the virtual machines in the about to fail physical machine to the other physical machine for operation.

However, in the operations of the HA cluster, the failure detection for physical machines only relies on heart-beat packets periodically transmitted between the physical machines. The packet is one packet with self-defined format sent by one single physical machine to the other physical machines per a fixed period of time. The packet generally includes a network address of a source physical machine or other names that can be used to represent the identity of the source physical machine so as to ensure the availability of a network connection between the source physical machine and a target physical machine. In case of network congestion, because the heart-beat packets may be lost in between the physical machines, the failure detection for the physical machines can result in a failure misjudgment, which then leads to unintended virtual machine evacuation operation.

SUMMARY

An exemplary embodiment of the disclosure provides a failure detection method for compute node, which is adapted to a cloud data processing system having a plurality of compute nodes and at least one management node. The method includes the following steps: each of the compute nodes performs a self-inspection on operating statuses of services being provided and resource usage statuses, and reports an inspection result to the management node; compute node dynamically adjusts a time interval of a next report and informs the management node of the time interval; and the management node checks a report condition of the inspection result according to the time interval, so as to determine whether the compute node fails.

An exemplary embodiment of the disclosure provides a cloud data processing system, which includes a plurality of compute nodes and at least one management node. Each of the compute nodes includes a self-checker, which performs a self-inspection on operating statuses of services being provided and resource usage statuses in order to report an inspection result, and dynamically adjusts a time interval for reporting the inspection result according to the inspection result. The management node includes receiving the inspection result reported and the time interval informed by each of the compute nodes, and checking a report condition of the inspection result reported by corresponding compute node so as to determine whether the corresponding compute node fails.

An exemplary embodiment of the disclosure provides a compute node, which includes: a self-checker, configured to perform a self-inspection on operating statuses of services being provided by the compute node and resource usage statuses, report an inspection result to at least one management node, dynamically adjust a time interval for reporting the inspection result according to the inspection result, and inform the management node of the time interval. The management node checks a report condition of the inspection result according to the time interval so as to determine whether the compute node fails.

To make the above features and advantages of the disclosure more comprehensible, several exemplary embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
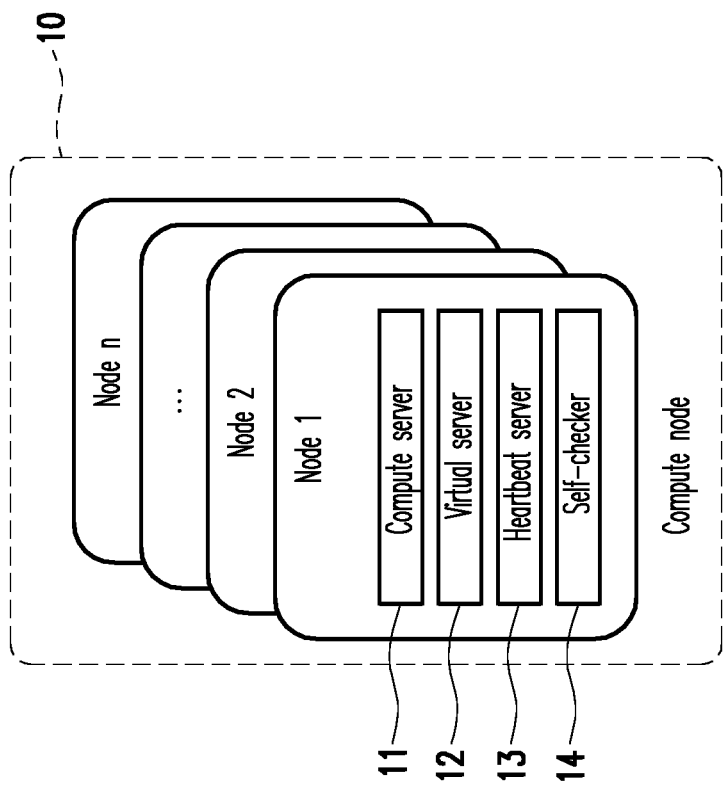
FIG. 1 is a block diagram illustrating a server according to an exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

To ensure correctness of a compute node failover function, in the disclosure, multiple embodiments are designed in time and space dimensions and a multiple inspection mechanism is implemented to confirm a true status of the compute nodes, and exemplary embodiments for virtual machine evacuation mechanism are provided. Implementation for the compute node failover function may refer to description provided in each of the exemplary embodiments.

In order to reduce a misjudgment of the failure detection of the compute nodes and the resource waste and resource competition caused by the misjudgment, methods provided in the following embodiments can be used to detect whether the compute node fails.

Embodiment of a progressive detection in time dimension: a compute node health checker (e.g., a compute node health checker 23 in FIG. 2) on a virtual machine management node (VMM node) can self-define a failure detection frequency and a failure confirmation threshold for the compute node according to a usage status and a resource capacity of cloud resources. When an accumulated count of failure reaching a failure confirmation threshold is determined, the compute node may then be determined to have failed. This kind of detection mechanism is flexible and can reduce the failure misjudgment caused by temporary network congestion.

Embodiment in space dimension: in addition to the compute node, any two systems or machines with different operational functions may be found to double-check the failure detection for the compute node to thereby improve accuracy of the failure detection for the compute node. In one embodiment, the virtual machine management node is used to detect an update frequency of a database of a compute service on the compute node and a heart-beat packet periodically sent by the compute node, so as to confirm a status of a connection between the virtual machine management node and the compute node; and a data center management node (DCM node) is used to confirm whether the connection is normal through a pathway for obtaining a resource usage of the compute node (a self-inspection of a compute machine). If the connection is normal, a service monitor on the data center management node may be further used to check operating statuses of services or a status of the compute service after being restarted.

After confirming that the compute node has failed, a virtual machine evacuation strategy that meets cloud management requirements (e.g., based on a batch parallel evacuation consideration or a load balancing consideration) may then be selected to perform a parallel evacuation on at least one virtual machine running on the failed compute node to other compute nodes (i.e. compute nodes other than the failed compute node).

In one embodiment the method includes: controlling and confirming a shutdown state of the compute node, as well as a target compute node selection strategy of the virtual machine evacuation: based on the batch parallel evacuation consideration or the load balancing consideration. Considerations for choosing the target compute node may include:

resource capacities of each compute node (CPU/memory/network);

used resources of each compute node (CPU/memory/network); and/or resource demands of each compute node (CPU/memory/network).

In one embodiment, a blacklist for maintaining the virtual machine evacuation is further included. By limiting a range of abnormal failure for the compute node, problematic virtual machine through execution of the virtual machine evacuation strategy may less likely cause other cloud compute nodes to fail.

FIG. 1 is a schematic diagram illustrating a compute node architecture according to an exemplary embodiment of the disclosure. With reference to FIG. 1, among a plurality of compute nodes 10 (including node 1 to node n, where n is a positive integer) in a cloud data management system, each of the compute nodes 10 is, for example, an electronic device with computing capability, such as a server, a workstation or a personal computer. The disclosure is not limited in this regard. Each of the compute nodes 10 includes a compute server 11, a virtual server 12, a heart-beat server 13 and a self-checker 14, which are, for example, computer programs loaded and executed by at least one processor (not illustrated) of the compute node 10 and may be supplemented with storage elements (e.g., a memory, a temporary buffer, etc., not illustrated) and/or a database (not illustrated) to implement a compute node failure detection method according to the disclosure. Each of the compute nodes 10 also includes a signal data transceiving element (not illustrated).

In one embodiment, the compute node 10 may provide a compute service through the compute server 11 and provide related operations for running a virtual machine through the virtual server 12 that supports various virtual machine management process services (Hypervisor services) such as Libvirt, KVM (Kernel-based Virtual Machine), QEMU (Quick Emulator), etc.

In one embodiment, the heart-beat server 13 can periodically transmit heart-beat packets to a management node based on a heart-beat service so as to confirm a status of a heart-beat connection with the management node.

In one embodiment, the self-checker 14 may be configured to check the operating statuses of services provided by the compute node 10 and resource usage statuses. The operating statuses of services include an operational status of the compute service and an operational status of a virtualized service. The resource usage statuses may include a resource usage status of a host-level and VM-level, also including a CPU resource usage amount/usage rate, a memory resource usage amount/usage rate, a disk space usage amount/usage rate, a network resource usage amount/usage rate, and/or other information for failure counting/metering (e.g., a packet discard count/discard rate). Moreover, in one embodiment, the self-checker 14 can also provide detection of hardware errors.

In one embodiment, the self-checker 14 can actively fix the errors and automatically restart the service when detecting errors related to the compute service (the compute service or a virtual service).

In one embodiment, after checking the resource usage statuses, the self-checker 14 may actively report an inspection result to other management nodes, and dynamically adjust the time of a next report of the statuses of services and the resource usage according to a resource condition.

One embodiment of the disclosure can provide a progressive detection mechanism, in which the compute node health checker on the virtual machine management node can set up a resource threshold for each compute node with respect to a compute resource capacity, a memory resource capacity, a disk space capacity, a network resource capacity of each compute node through a pre-defined threshold formulating mechanism. Nonetheless, the pre-defined threshold formulating mechanism is not particularly limited by this disclosure. When the checked parameters, such as the resource usage amount/usage rate and the packet discard count/discard rate, exceed the corresponding thresholds, a time interval for reporting back the inspection result is shortened to thereby increase the frequency of interaction with other management nodes.

When the self-checker 14 detects the hardware errors, if the self-checker 14 fails to actively report an internal information due to the hardware errors (e.g., a CPU error) so other management nodes cannot receive the operating statuses of services and the resource usage statuses reported by the self-checker 14 at a predefined time, a failure count of the compute node 10 will be accumulated.

Figure 2:
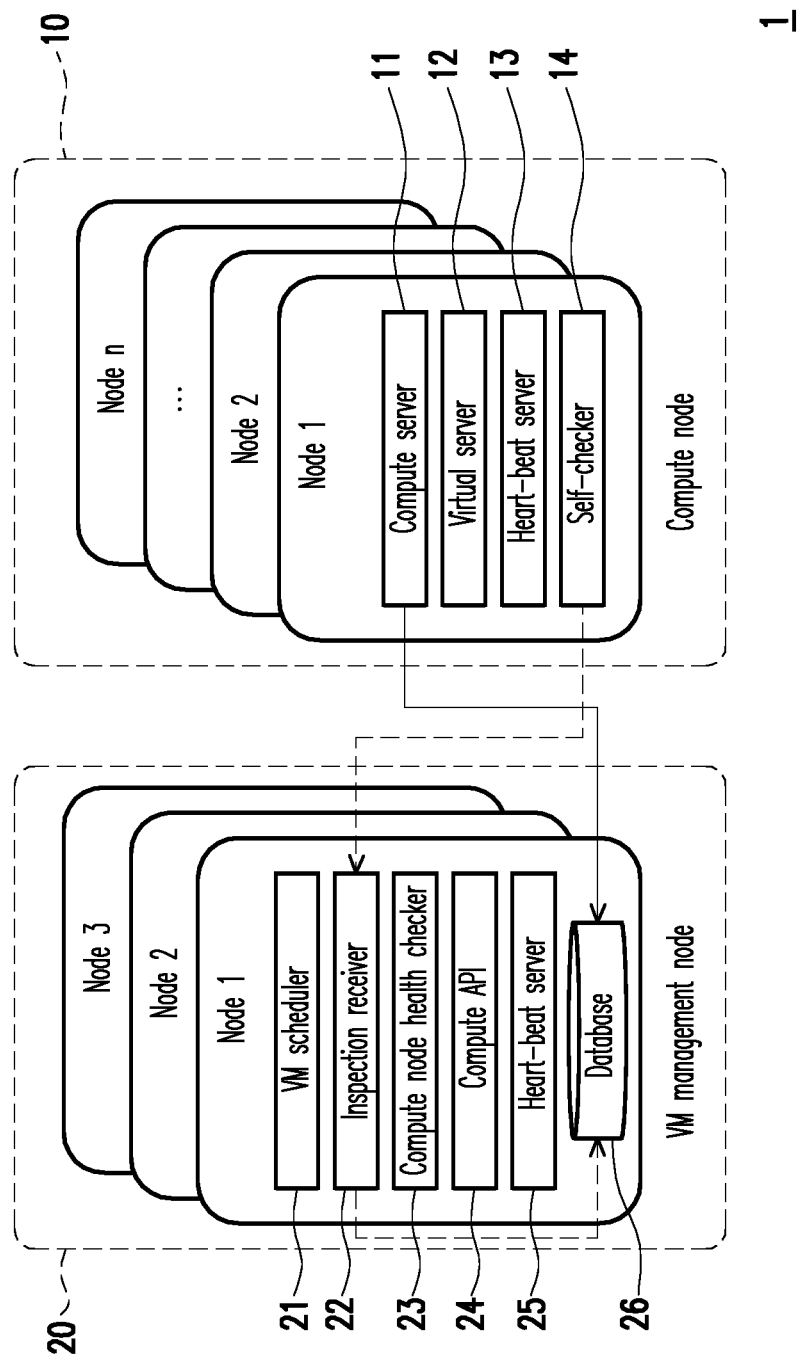
FIG. 2 is a schematic diagram illustrating a cloud data processing system according to an exemplary embodiment of the disclosure.

FIG. 2 is a schematic diagram illustrating a cloud data processing system according to an exemplary embodiment of the disclosure. With reference to FIG. 2, a cloud data processing system 1 includes a plurality of compute nodes 10 and at least one management node (three virtual machine management nodes 20 are taken as example in this embodiment, but the disclosure is not limited thereto). Here, the three virtual machine management nodes 20 adopt, for example, the operations of the HA cluster to form a cluster for maintaining data synchronization with each other. In this way, when any one of the virtual machine management nodes 20 fails, the other virtual machine management nodes 20 can take over the operations to ensure that a virtual machine management function can be performed continuously.

The virtual machine management node 20 includes a virtual machine scheduler (VM scheduler) 21, an inspection receiver 22, the compute node health checker 23, a compute application programming interface (API) 24 and a heart-beat server 25, which are computer programs loaded and executed by a processor (not illustrated) of the virtual machine management node 20 to implement the compute node failure detection method of the disclosure. The virtual machine management node 20 further includes a storage device (a database) and/or a storage element (e.g., a memory, a temporary buffer, etc., not illustrated), which are used to store information of virtual machines running on each of compute nodes 10. The virtual machine management node 20 also includes a data transceiving element (not illustrated). Herein, for example, when the virtual machine needs to be established or evacuated, the virtual machine scheduler 21 selects a target compute node from a plurality of compute nodes 10 so the virtual machine may be activated in the target compute node or the virtual machine may be evacuated to the target compute node.

The inspection receiver 22 is configured to receive the inspection result and the time interval for the next report of the inspection result from the self-checker 14 of the compute node 10. If the inspection result reported from the self-checker 14 is not being received within a report time defined by the time interval, the inspection receiver 22 will accumulate the failure count of the compute node 10 and store related information into a database 26.

In one embodiment, other than reporting the inspection result through the self-checker 14, the compute node 10 may also periodically maintain the related information of the virtual machine and a current update time in the database 26 of the virtual machine management node 20 through the compute server 11 according to a preset period of time. Correspondingly, the compute node health checker 23 of the virtual machine management node 20 may determine an operating state of the compute node 10 by checking the time and/or the frequency at which the compute server 11 maintains the database 26.

The compute application programming interface 24 is provided to allow users to activate the virtual machine through this interface so the virtual machine scheduler 21 can choose the target compute node from a plurality of compute nodes 10 in which the virtual machine can be activated. It should be noted that, a shared storage is provided between the plurality of compute nodes 10. The compute node 10 may be connected to the shared storage through the compute server 11 when being selected by the virtual machine scheduler 21, so as to provide a storage resource required for activating the virtual machine.

The heart-beat server 25 corresponds to the heart-beat server 13 of the compute node 10, and is configured to periodically transmit the heart-beat packets with the heart-beat server 13 so as to confirm the status of the heart-beat connection with the compute node 10.

In one embodiment, the inspection receiver 22 of the virtual machine management node 20 compares a virtual machine resource usage detected by the self-checker 14 with a virtual machine resource specification predefined in the database 26 so as to confirm whether the resource usage is excessive. If a usage amount and a usage rate of resources of one particular virtual machine exceeds a preset value or a preset ratio defined by the compute node health checker 23, that particular virtual machine would be put on a blacklist by the inspection receiver 22. This blacklist may be used in a virtual machine failover evacuation stage to reduce the resource usage and reduce the possibility that the other compute nodes fail due to the virtual machine with management issues, and the virtual machine put on the blacklist is prohibited from being evacuated to the other compute nodes. In addition, if the usage amount/the usage rate of the resources of one particular virtual machine does not exceed a usage threshold but exceed the preset value, the particular virtual machine may be temporarily put on a watch list for continuous observation.

Figure 3:
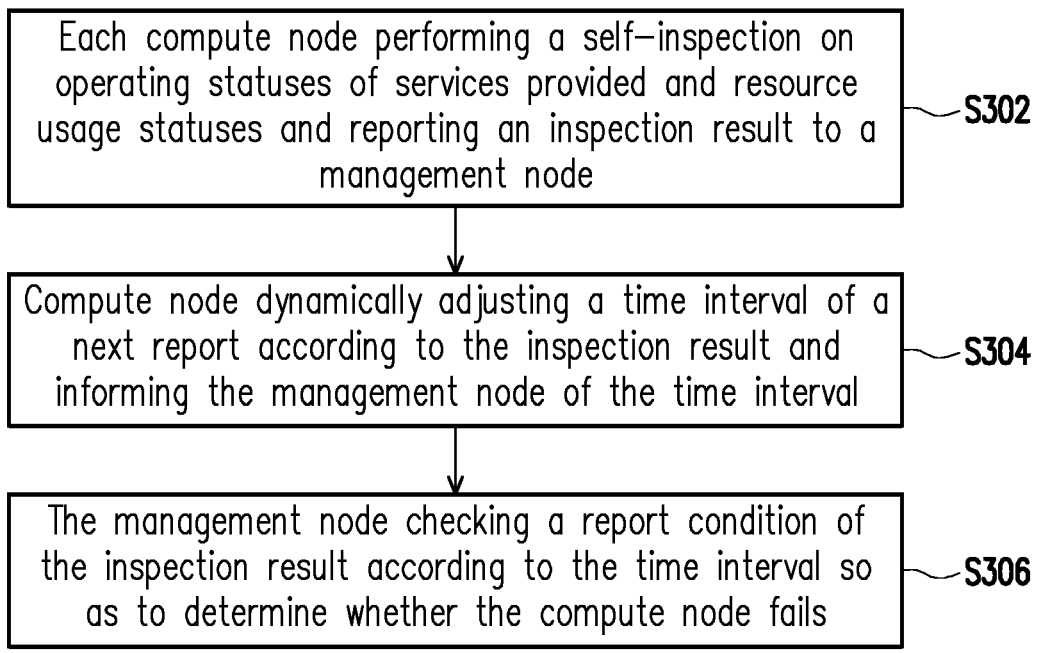
FIG. 3 is a flowchart illustrating a failure detection method for a compute node according to an exemplary embodiment of the disclosure.

FIG. 3 is a flowchart illustrating a failure detection method for a compute node according to an exemplary embodiment of the disclosure. Referring to FIG. 2 and FIG. 3 together, the method of this embodiment is adapted to the cloud data processing system 1 of FIG. 2. Detailed steps in the failure detection method of compute node according to one embodiment of the disclosure are described below with reference to various devices in the cloud data processing system 1.

In this embodiment, the self-checker 14 of the compute node 10 performs a self-inspection on operating statuses of services being provided by the compute node 10 and resource usage statuses, and reports an inspection result to the management node 20 (step S302). Here, the operating statuses of services include, for example, the operational status of the compute service and the operational status of the virtual service. The resource usage statuses include the resource usage amount/usage rate, the memory resource usage amount/usage rate, the disk space usage amount/usage rate, the network resource usage amount/usage rate, and other information for failure counting/metering (e.g., the packet discard count/discard rate), which are not particularly limited herein.

The self-checker 14 of the compute node 10 dynamically adjusts a time interval of a next report according to an inspection result and informs the management node 20 of the time interval (step S304).

The compute node health checker 23 of the virtual machine management node 20 can define the time interval and the number of times for reporting the inspection result by the self-checker 14 according to the resource usage statuses of the compute node 10 through a self-defined algorithmic mechanism. In one embodiment, the compute node health checker 23 can set a preset threshold for each of the operating resource capacity, the memory resource capacity, the disk space capacity, the network resource capacity and the packet discard count, and shorten the defined time interval when the usage amount/the usage rate of any source among aforesaid resources exceeds the usage threshold. In another embodiment, the compute node health checker 23 can set a preset threshold for each of the CPU resource capacity, the memory resource capacity, the disk space capacity, the network resource capacity and the packet discard amount, and shorten the defined time interval when the usage rate/the usage amount of any source among the resources exceeds the preset threshold.

In yet another embodiment, the compute node health checker 23 can set multiple thresholds for each of the operating resource capacity, the memory resource capacity, the disk space capacity, the network resource capacity and the packet discard count, so as to shorten a failure detection cycle for the compute node. For instance, the multiple thresholds may be set to 75% and 85% respectively for the usage rates of the operating resource and the network resource. When the usage rate of the operating resource of the compute node exceeds a compute resource threshold 75%, a failure detection time interval of the compute node may be shortened from t0 to t1; when the usage rate of the operating resource of the compute node exceeds a compute resource threshold 85%, the failure detection time interval of the compute node may be further shortened to t2; when the usage rate of the network resource of the compute node exceeds a network resource threshold 75%, the failure detection time interval of the compute node may be shortened to t3; and when the usage rate of the network resource of the compute node exceeds a network resource threshold 85%, the failure detection time interval of the compute node may be further shortened to t4. Here, t0>t1>t2>t3. That is to say, when one compute node has more resources exceeding the resource usage threshold in terms of types and threshold levels, the failure detection cycle of the compute node would be shorter.

The inspection receiver 22 of the virtual machine management node 20 checks a report condition of the inspection result according to the time interval informed by the self-checker 14 so as to determine whether the compute node 10 fails (step S306). Here for example, the inspection receiver 22 checks whether the inspection result is being received within the report time defined by the time interval, accumulates the failure count if the inspection result is not being received, and stores the related information into the database. Thereafter, the inspection receiver 22 continues to check the report condition of the inspection result according to the report time defined by the time interval and accumulates the failure count accordingly, and determines that the compute node 10 fails when the accumulated failure count is greater than a failure threshold.

Figure 4:
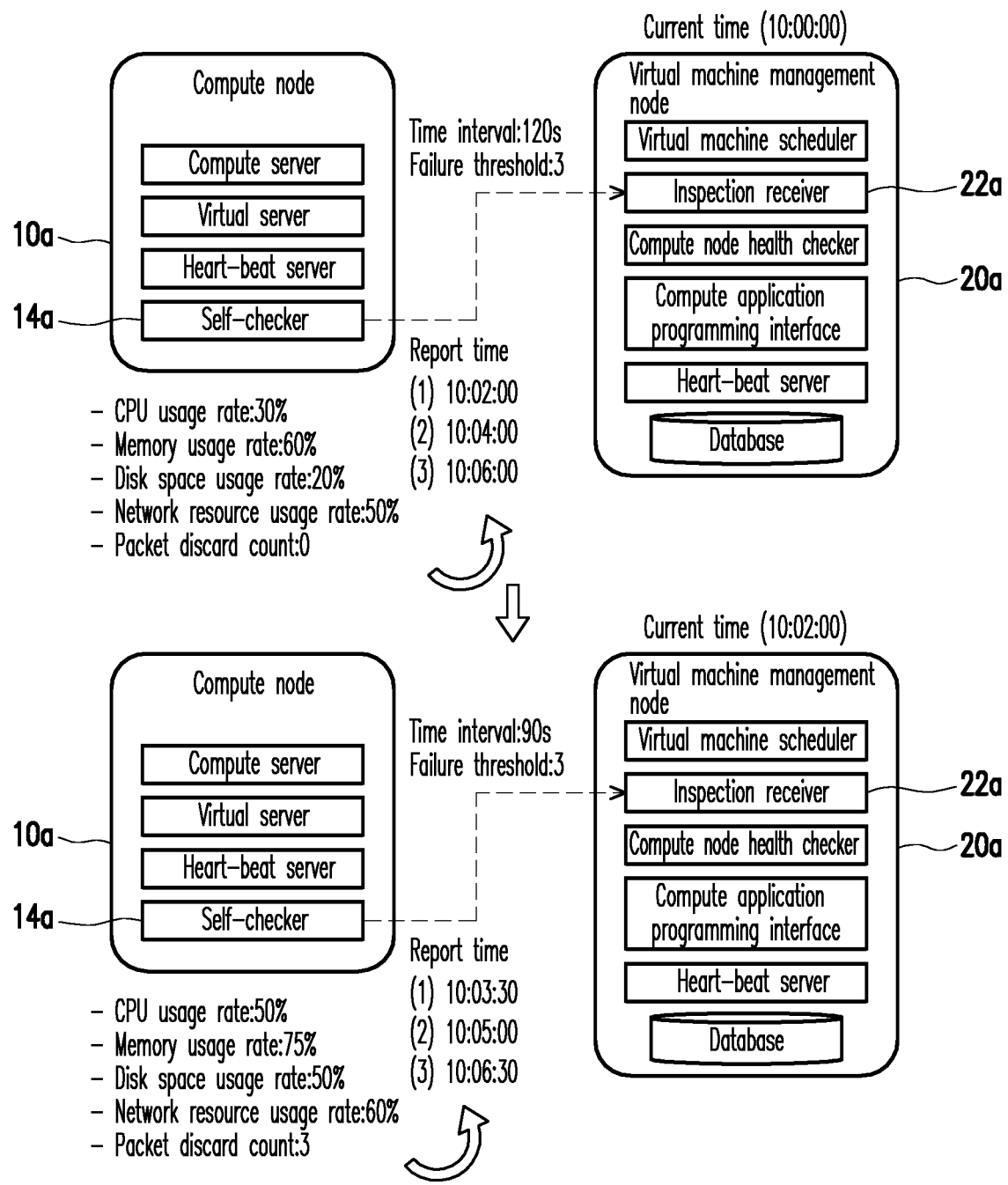
FIG. 4 is a schematic diagram illustrating a progressive failure detection for a compute node according to an exemplary embodiment of the disclosure.

For instance, FIG. 4 is a schematic diagram illustrating a progressive failure detection for a compute node according to an exemplary embodiment of the disclosure. With reference to FIG. 4, in this embodiment, the time interval for executing the detection and reporting the inspection result is defined for a self-checker 14a of a compute node 10a, and a CPU usage rate, a memory usage rate, a disk space usage rate and a packet discard amount/discard rate are compared with preset thresholds, respectively. In this way, when the usage rate of the resources of the compute node 10a is increased over time, the time interval for reporting the inspection result by the self-checker 14a is shortened accordingly.

Here, at a time point (10:00:00), the self-checker 14a checks the resource usage status of the compute node 10a at that time and obtains the CPU usage rate of 30%, the memory usage rate of 60%, the disk space usage rate of 20%, the network resource usage rate of 50% and the packet discard count being 0 (or discard rate of 0%), accordingly the resource usage status of the compute node 10a is determined to be normal, and the time interval of the next report is determined to be 120 seconds. At this time, other than reporting the information of the resource usage status to an inspection receiver 22a of a virtual machine management node 20a, the self-checker 14a also informs the inspection receiver 22a of the time interval for the next report of the inspection result and a predefined failure threshold (3) at the same time. The inspection receiver 22a may estimate according to such time interval that the self-checker 14a would report the inspection result at time points (10:02:00), (10:04:00) and (10:06:00). However, at the time point (10:02:00), if the inspection receiver 22a does not receive the inspection result reported by the self-checker 14a or there are errors in the information of the inspection result, the inspection receiver 22a will accumulate the error count and store the related information into a database 26a. If the inspection result reported by the self-checker 14a is not being received at the above three time points or there the information of the inspection result is wrong, the accumulated error count by the inspection receiver 22a will reach the failure threshold (3), thereby determine that the compute node 10a fails.

On the other hand, when the preset report time (i.e., 10:02:00) is reached, the self-checker 14a checks the resource usage status of the compute node 10a at that time and obtains a CPU usage rate of 50%, a memory usage rate of 75%, a disk space usage rate of 50%, a network resource usage rate of 60% and the packet discard count of 3 (or discard rate of 30%). Based on this, the usage amount/the usage rate of the resource of the compute node 10a is determined to be increased. Here, the CPU usage rate, the memory usage rate and network resource usage rate all exceed the thresholds. At this time, the self-checker 14a dynamically adjusts the originally set time interval to 90 seconds, and informs the inspection receiver 22a of the virtual machine management node 20a. Similarly, the inspection receiver 22a may estimate according to such time interval that the self-checker 14a will report the inspection result at (10:03:30), (10:05:00) and (10:06:30) instead, so as to determine whether the compute node 10 fails according to whether the inspection result is received at the three time points.

With the progressive failure detection described above, the management node can estimate the next report time of the compute node according to the time interval informed by the compute node, and only accumulate the failure count first without directly determining that compute node fails if the inspection result is not being received. Instead, the compute node is determined to truly fail only when the failure is constantly detected and the accumulated failure count reaches the failure threshold. In this way, misjudgment caused by temporary network congestion can be reduced.

In addition to the report detection described above, in one embodiment, the management node may further combine multiple detection methods such as database update detection and heart-beat detection to increase the accuracy of a failure detection.

Figure 5:
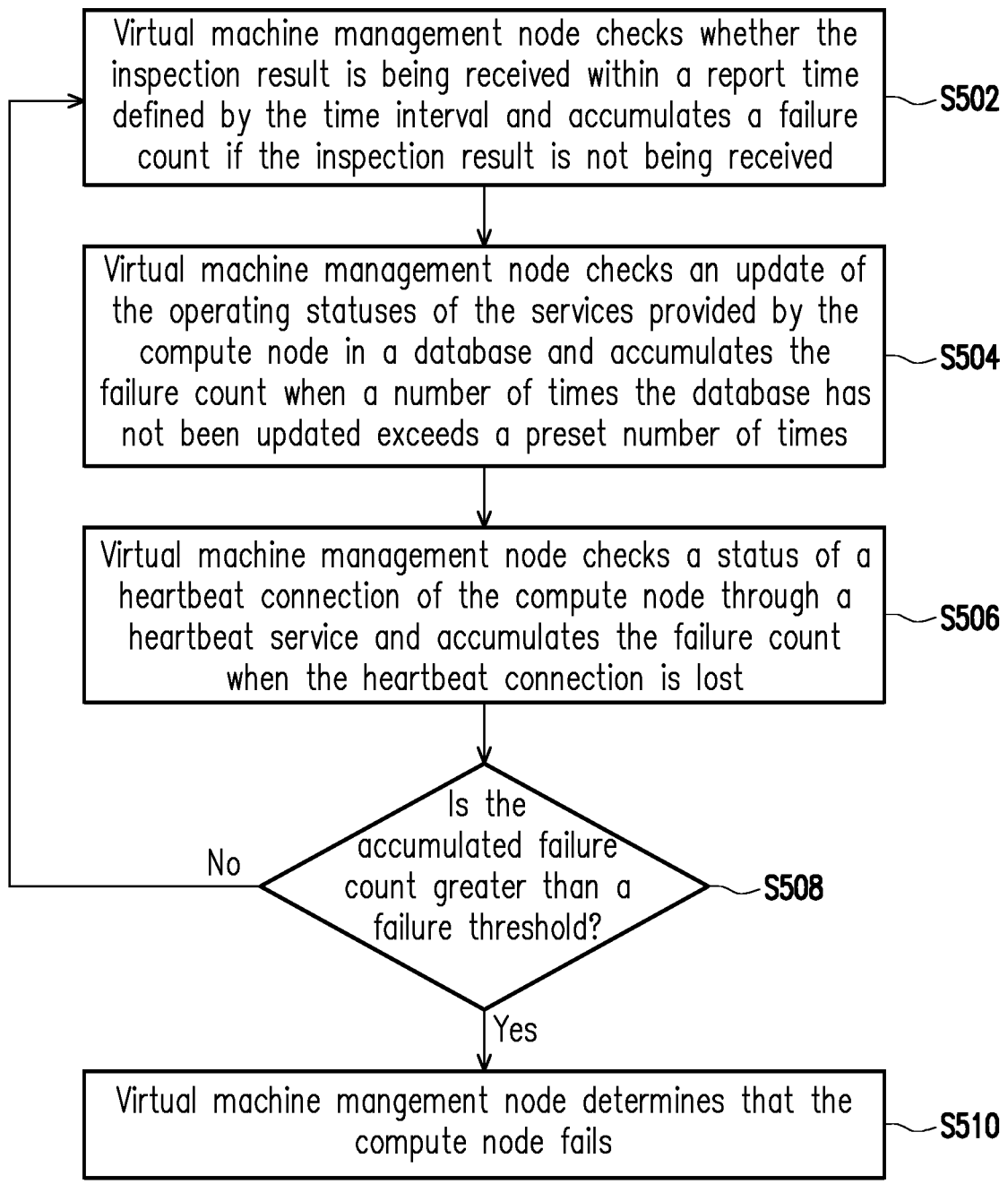
FIG. 5 is a flowchart illustrating a failure detection method of a compute node according to an exemplary embodiment of the disclosure.

FIG. 5 is a flowchart illustrating a failure detection method of a compute node according to an exemplary embodiment of the disclosure. Referring to FIG. 2 and FIG. 5 together, the method of this embodiment is adapted to the cloud data processing system 1 of FIG. 2. Detailed steps in the failure detection method of compute node according to the disclosure are described below with reference to various devices in the cloud data processing system 1.

First, the inspection receiver 22 of the virtual machine management node 20 determines whether the inspection result reported by the self-checker 14 is being received within a report time defined by the time interval informed by the self-checker 14 of the compute node 10, and accumulates a failure count if the inspection result is not being received (step S502). Here, the embodiment in which the inspection result is checked within the report time defined by the time interval is similar or identical to step S306 in the foregoing embodiment, which is not repeated hereinafter.

At this time, the compute node health checker 23 of the virtual machine management node 20 checks an update performed by the compute server 11 of the compute node 10 on the operating statuses of services provided by the compute node 10 in the database 26, and accumulates the failure count if a number of times the database 26 is not updated exceeds a preset number of times (step S504).

The compute server 11 of the compute node 10 can periodically maintain the operating statuses of services (e.g., the related information of the virtual machine) provided by the compute node 10 and the current updating time in the database 26 of the virtual machine management node 20 according to a predetermined time cycle $t^{DB}$. Accordingly, in one embodiment, the compute node health checker 23 checks a time $t_j^{last}$ at which the last time database 26 is updated by the compute server 11, calculates an un-updated time length according to a current time $t^{current}$, and determines whether to accumulate the error count according to the following condition:

$$t^{current} - t_j^{last} > m \times t^{DB} \qquad (1)$$

Here, $m \times t^{DB}$ is the preset failure threshold. If the condition above is satisfied, it means that the database 26 has not being updated by the compute server 11 for over m rounds. At this time, the compute node health checker 23 will accumulate the failure count recorded in the database 26 by one.

In addition, the compute node health checker 23 checks a status of a heart-beat connection with the compute node 10 through a heart-beat service provided by the heart-beat server 25, and accumulates the failure count when the heart-beat connection is lost (step S506).

The compute node health checker 23 checks, for example, whether the accumulated failure count recorded in the database 26 is greater than the failure threshold (step S508). Here, if the accumulated failure count is not greater than the failure threshold, the process returns to step S502 and repeats the failure detection in steps S502 to S506. Otherwise, if the accumulated failure count is greater than the failure threshold, the compute node health checker 23 determines that the compute node 10 fails and thus the virtual machine evacuation may be performed accordingly.

It should be noted that, the inspection result from one single node may not be convincing, in order to prevent a local failure problem in the failure detection, one embodiment of the disclosure further combines the self-inspection of the compute node with monitoring of the virtual machine management node and the data center management node, so as to improve correctness of the failure detection.

Figure 6:
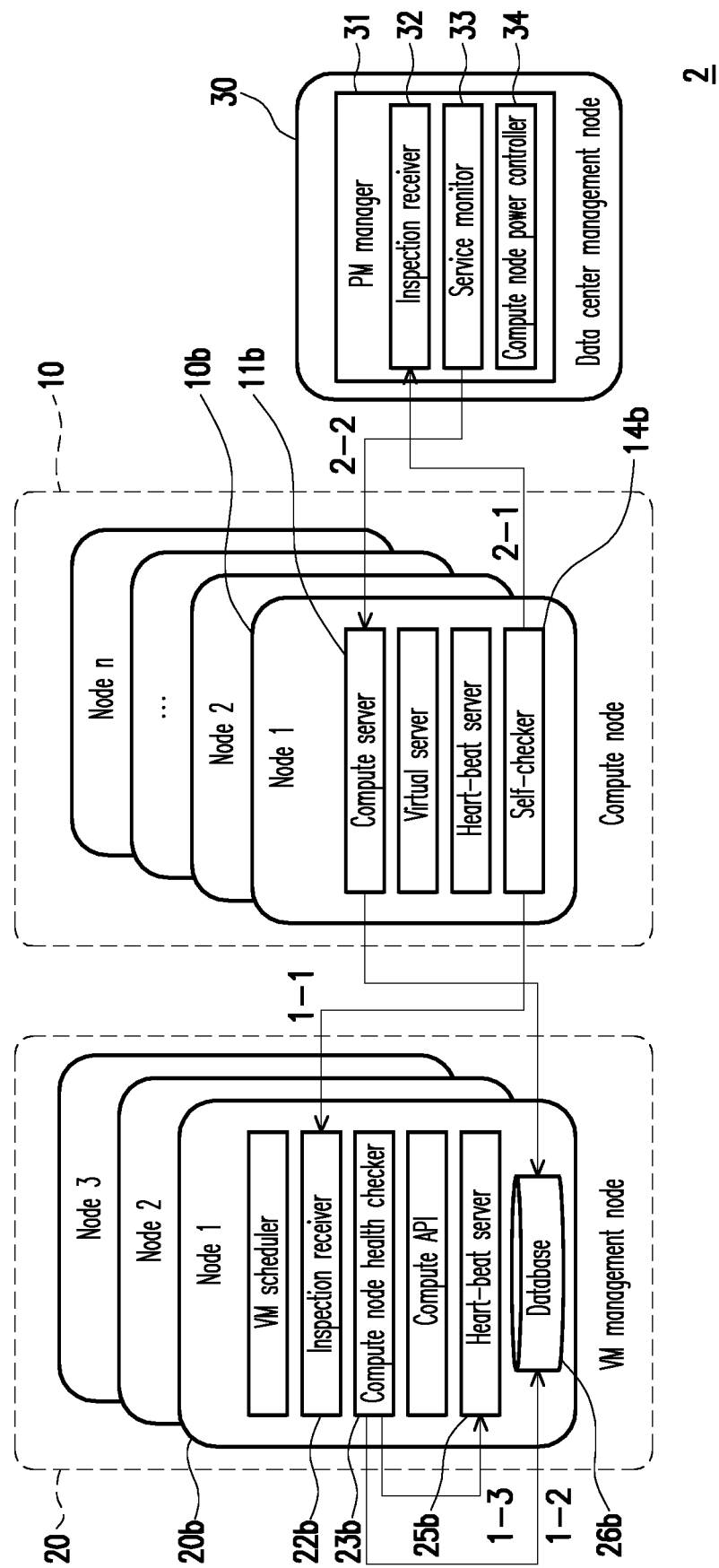
FIG. 6 is a schematic diagram illustrating a cloud data processing system according to an exemplary embodiment of the disclosure.

FIG. 6 is a schematic diagram illustrating a cloud data processing system according to an exemplary embodiment of the disclosure. With reference to FIG. 6, a cloud data processing system 2 of this embodiment includes a plurality of compute nodes 10, three virtual machine management nodes 20 (a compute node 10b and a virtual machine management node 20b are taken as example in this embodiment) and a data center management node 30. Here, the architectures of the compute node 10b and the virtual machine management node 20b are identical or similar to the architecture of the compute node 10 and the virtual machine management node 20 in the foregoing embodiment, and thus details thereof are not repeated hereinafter.

The cloud data processing system 2 of this embodiment additionally uses the data center management node 30 to monitor the compute node 10b so as to assist in determining whether the compute node 10b fails. A physical machine manager (PM manager) 31 of the data center management node 30 includes an inspection receiver 32, a service monitor 33 and a compute node power controller 34. Among them, the inspection receiver 32 is similar to the inspection receiver 22b of the virtual machine management node 20b, and is used to receive the inspection result and the time interval for the next report of the inspection result from a self-checker 14b of the compute node 10b. If the inspection result reported from the self-checker 14b of the compute node 10b is not being received within the report time defined by the time interval, the inspection receiver 32 would accumulate the failure count of the compute node 10b and store the related information into a database 26b of the virtual machine management node 20b.

Under the circumstance where a pathway connecting the data center management node 30 and the compute node 10b may be normally connected, the service monitor 33 can check the operating statuses of a compute server 11b of the compute node 10b or check whether a service restart of the self-checker 14b of the compute node 10b is operated successfully.

The compute node power controller 34 has the capability of shutting down the failed compute node. By shutting down the failed compute node, a possibility that the cloud data processing system 2 has two identical virtual machines existing at the same time after the virtual machine evacuation may be avoided.

Based on the architecture of the cloud data processing system 2 described above, in this embodiment, the multiple inspection mechanism (including inspections 1-1 to 1-3 related to the virtual machine management node 20b and inspections 2-1 to 2-2 related to the data center management node 30) is set, and whether the compute node 10b fails is determined according to results from the inspections above so the failure count can be accumulated accordingly. The inspections are described as follows.

The inspection 1-1: the self-checker 14b of the compute node 10b can fix the failure on the compute service, and actively inform the inspection receiver 22b of the virtual machine management node 20b of the operating statuses of services and the resource usage status, and inform the time interval of the next report for arranging the time of the next report. The inspection receiver 14b checks, for example, whether a reception of the inspection result is normal within a report time defined by the time interval so as to obtain a first status. Here, if the inspection receiver 22b cannot receive the inspection result within the arranged time due to the hardware errors on the compute node 10b or other reasons, then it means that the compute node 10b may fail.

The inspection 1-2: a compute node health checker 23b of the virtual machine management node 20b checks a time at which the database 26b is last updated by the compute server 11b of the compute node 10b, and determines whether an update performed by the compute server 11b on the operating statuses of services provided by the compute node 10b is normal so as to obtain a second status. Here, if the compute server 11b does not maintain or update the database 26b for over m rounds, then it means that the compute node 10b may fail.

The inspection 1-3: the compute node health checker 23b of the virtual machine management node 20b checks whether a heart-beat connection with the compute node 10b is normal through a heart-beat service provided by a heart-beat server 25b, so as to obtain a third status. Herein, when the heart-beat is lost, it means that the compute node 10b may fail.

The inspection 2-1: the physical machine manager 31 of the data center management node 30 checks a connection status with the compute node 10b by periodically obtaining resources pathway of the physical machine from the inspection receiver 32. Here, the inspection receiver 32 checks whether a reception of the inspection result is normal within the report time defined by the time interval informed by the self-checker 14b so as to obtain a fourth status. If the inspection receiver 32 does not receive the inspection result reported from the self-checker 14b within that specific time, then it means that the compute node 10b may fail.

The inspection 2-2: the service monitor 32 of the data center management node 30 connected to the compute node 10b checks whether the operating statuses of services of the compute node 10b are normal so as to obtain a fifth status.

Here, under the circumstance where the pathway connecting to the compute node 10b may be connected normally, the data center management node 30 can check the operating statuses of the compute service on the compute node 10b or check whether the service restart of the self-checker 14b of the compute node 10b is operated successfully through the service monitor 32. If the compute service on the compute node 10b is not in an operating state, and such service cannot be restarted successfully, then it means that the compute node 10b may fail.

For the results of the above inspections, the embodiment defines a plurality of scenarios, and subsequent operational behaviors corresponding to the scenarios, as shown by Table 1 below.

TABLE 1

| Scenario | Inspection | | | | | Subsequent operating behavior |
| | 1-1 | 1-2 | 1-3 | 2-1 | 2-2 | |
| --- | --- | --- | --- | --- | --- | --- |
| A | Failed | Failed | Normal | Failed | Failed | The service monitor 33 confirms whether the compute service falls into a restart loop (If so, $f_j + 1$) |
| B | Failed | Failed | Failed | Failed | — | Accumulate failure count: $f_j + 1$ |
| C | Failed | Failed | Failed | Normal | Failed | The service monitor 33 monitors whether the compute service is restarted successfully by the self-checker 14b (if not, $f_j + 1$) |
| D | Failed | Failed | Normal | Failed | — | The inspection receiver 22b monitors whether the compute service is restarted successfully by the self-checker 14b (if not, $f_j + 1$) |

In a scenario A, the connection with the compute node 10b is normal, but the compute service of the compute server 11b is abnormal and fails to be restarted. Therefore, when the service monitor 33 of the data center management node 30 confirms that the compute server 11b falls into the restart loop, the failure count of the compute node $CN_j$ is accumulated ($f_j+1$).

In a scenario B, the connection with the compute node 10b is lost and the compute node 10b fails or has the hardware errors, which means that the entire compute node 10b may encounter problems and therefore the failure count is directly accumulated ($f_j+1$).

In a scenario C, the compute node 10b loses connection with the virtual machine management node 20b but has normal connection with the data center management node 30. However, since the compute service of the compute server 11b fails, the compute service needs to be restarted by the service monitor of the data center management node 30. Yet, if the compute service fails to be restarted, the failure count is accumulated ($f_j+1$).

In a scenario D, the compute node 10b loses connection with the data center management node 30 but has normal connection with the virtual machine management node 20b. However, since the compute service of the compute server 11b fails, the compute service will be automatically restarted by the self-checker 14b. If the compute service fails to be restarted, when reporting the operating status of the services and the resource usage status to the inspection receiver 22b of the virtual machine management node 20b, the self-checker 14b accumulates the failure count ($f_j+1$).

Based on the consideration in time dimension, the adjustable time interval of the failure detection (FD) and a failure threshold F of the failure count have been set for the multiple inspection mechanism in this embodiment. Once an accumulated number of consecutive failure detections of the compute node $CN_j$ is greater than the failure threshold F (i.e., $f_j \geq F$), the compute node is considered to be a true failure.

If the failure conditions above are met, a virtual machine evacuation stage of stage two will be entered.

Figure 7A:
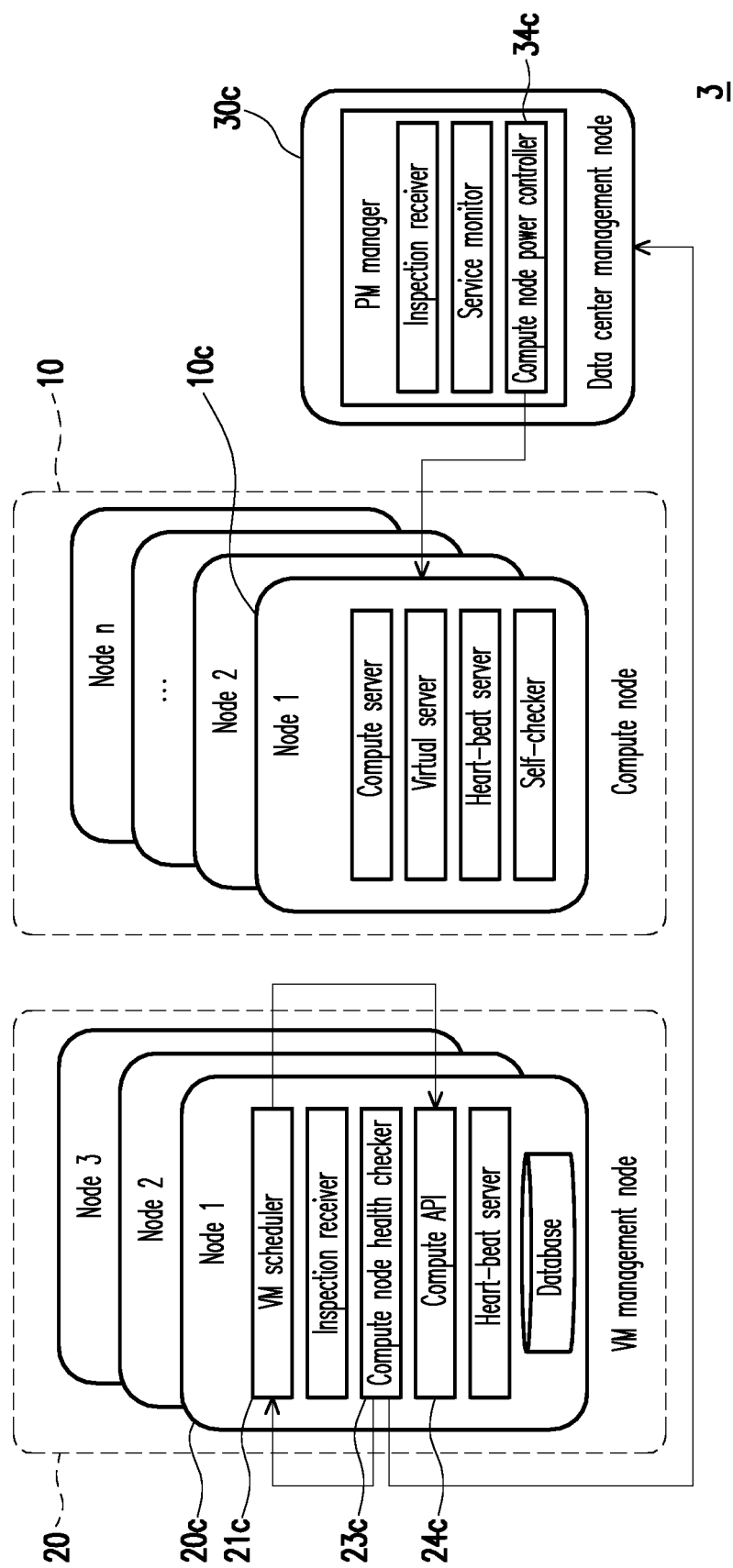
FIG. 7A is a schematic diagram illustrating a network architecture for determining whether a work evacuation is required according to an exemplary embodiment of the disclosure.
Figure 7B:
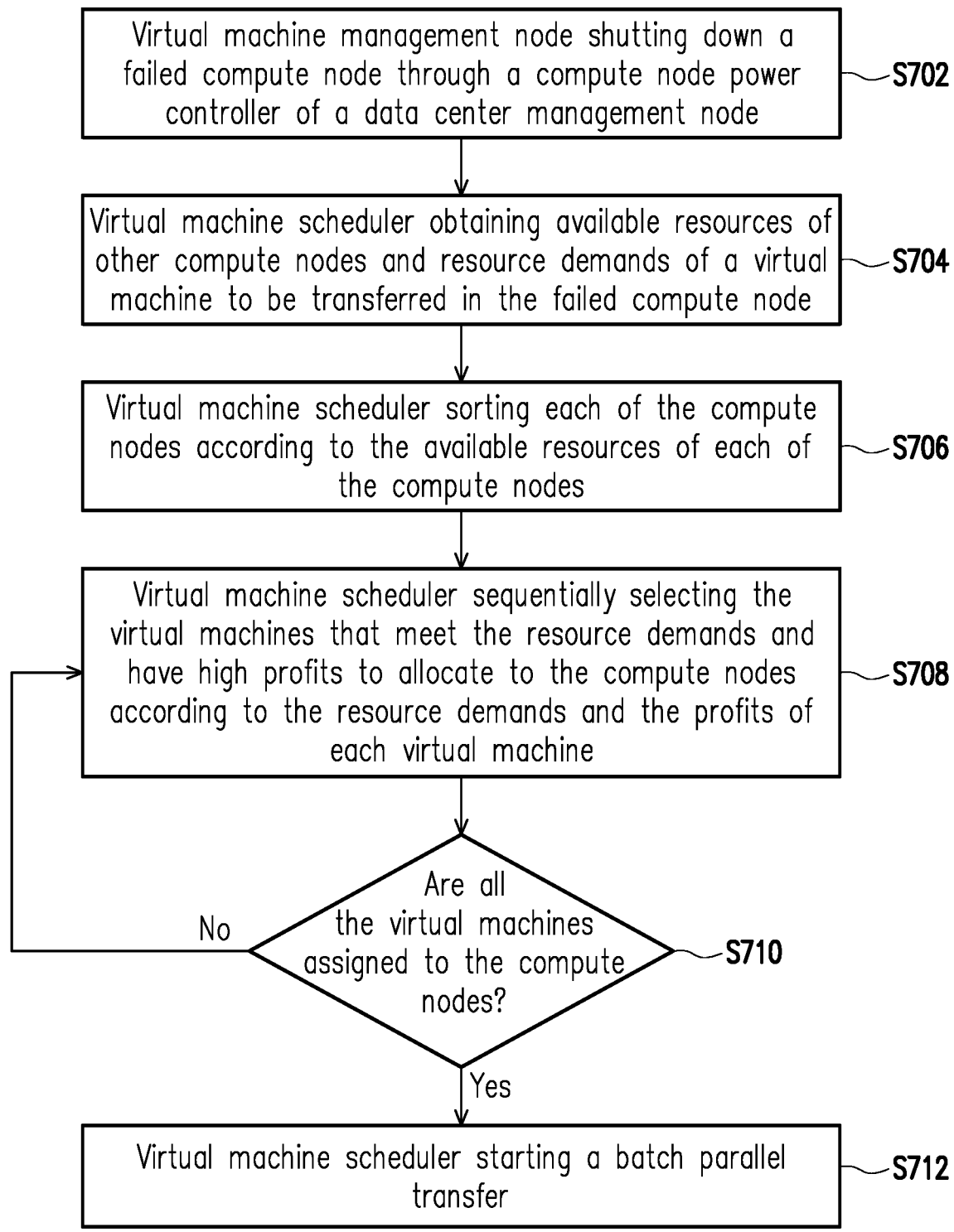
FIG. 7B is a flowchart illustrating a virtual machine evacuation method according to another exemplary embodiment of the disclosure.

FIG. 7A is a schematic diagram illustrating the virtual machine evacuation mechanism according to an exemplary embodiment of the disclosure. FIG. 7B is a flowchart illustrating a virtual machine evacuation method according to another exemplary embodiment of the disclosure. With reference to FIG. 7A, a cloud data processing system 3 of this embodiment includes a plurality of compute nodes 10, three virtual machine management nodes 20 (a compute node 10c and a virtual machine management node 20c are taken as example in this embodiment) and a data center management node 30c. Here, the architectures of the compute node 10c, the virtual machine management node 20c and the data enter management node 30c are identical or similar to the architecture of the compute node 10, the virtual machine management node 20 and the data center management node 30 in the foregoing embodiment, and thus details thereof are not repeated hereinafter.

With reference to FIG. 7B, when the virtual machine management node 20c confirms that the compute node 10c fails, and proceeds to the virtual machine evacuation stage, a compute node health checker 23c of the virtual machine management node 20c shuts down the failed compute node 10c, for example, through the compute node power controller 34c of the data center management node 30c (step S702). Afterwards, the compute node health checker 23c notifies a virtual machine scheduler 21c to execute the virtual machine evacuation strategy so as to determine to which target compute node each virtual machine on the failed compute node 10c should be evacuated.

The virtual machine scheduler 21c may, for example, obtain available resources of the other compute nodes and the resource demands of the virtual machine to be evacuated in the failed compute node (step S704), so as to select the plurality of compute nodes with more available resources from the other compute nodes for assigning the virtual machine. Here, for example, the virtual machine scheduler 21c first sorts each compute node $CN_j$ according to amounts of the available resources $Priority_j$ (calculation formula provided below) of each of the compute nodes $CN_j$ (step S706).

$$Priority_j = \alpha \times r_j^{cpu} + \beta \times r_j^{mem} + \gamma \times r_j^{net} \quad (2)$$

Here, $\alpha \geq 0$, $\beta \geq 0$, $\gamma \geq 0$, $\alpha+\beta+\gamma=1$.

The compute node with higher availability of resource is more capable of satisfying the virtual machine with higher resource demands, and the larger the guaranteed profits. Therefore the compute node with more available resources has the right to choose the virtual machine first in this embodiment.

Then, the virtual machine scheduler 21c sequentially selects the virtual machines with satisfiable resource demands and higher profits to be assigned to the compute node according to the resource demands and the profits of each of the virtual machines (step S708). Here, the profits $w_{i,j}^{profit}$ of it of the virtual machine $VM_i$ to be chosen by the compute node $CN_j$ is:

$$w_{i,j}^{profit} = \frac{p_i}{\alpha \times \frac{d_i^{cpu}}{c_j^{cpu}} + \beta \times \frac{d_i^{mem}}{c_j^{mem}} + \gamma \times \frac{d_i^{net}}{c_j^{net}}} \quad (3)$$

Here, the numerator $p_i$ above is a profit guaranteed by compute node for satisfying each of the virtual machines, and the denominator is a resource cost consumed by the compute node $CN_j$ for running of the virtual machine $VM_i$. In this embodiment, the profits refers to the ratio of a profit guaranteed by the compute node for satisfying each of the virtual machines to a resource cost consumed by the compute node for running of the virtual machine.

For instance, when it is the turn of the compute node $CN_j$ for choosing the virtual machine, if a relationship between the profits is: $w_{1,j}^{profit} > w_{3,j}^{profit} > w_{2,j}^{profit}$, $VM_1$ would be selected first. That is to say, $VM_1$ will be evacuated to the compute node $CN_j$ for running.

It should be noted that, when selecting the target compute node, the virtual machine scheduler 21c would not take those virtual machines with resource usage management issue (e.g., the virtual machines on the blacklist) for the evacuation.

Lastly, the virtual machine scheduler 21c determines whether all the virtual machines to be evacuated are assigned to the compute node or whether there is no more virtual machine to be chosen (step S710). If there is any virtual machine yet to be assigned, the process returns to step S708 to continue assigning the next round; and if all the virtual machines are being assigned, the virtual machine scheduler 21c then completes the scheduling for the virtual machine evacuation and may start the batch parallel evacuation (step S712). Here, the virtual machine scheduler 21c can notify a compute application program interface 24c to display a completed virtual machine evacuation schedule.

For instance, assuming that the resource demands and the profits of the virtual machine $VM_i$ are as shown by Table 2 below and the resource capacity, the usage amount and the available amount (remaining resources) of the compute node $CN_j$ are as shown by Table 3 below, the virtual machine scheduler 21c can perform the related scheduling for evacuating the virtual machine to the available compute node according to aforementioned information so as to satisfy a management strategy of the compute node health checker 23c.

TABLE 2

| $VM_i$ | CPU demand | Memory demand | Network demand | Profit |
|---|---|---|---|---|
| Resource demands and profits | $d_i^{cpu}$ | $d_i^{mem}$ | $d_i^{net}$ | $p_i$ |

TABLE 3

| $CN_j$ | Capacity | Usage amount | Remaining resources |
|---|---|---|---|
| CPU | $c_j^{cpu}$ | $u_j^{cpu}$ | $r_j^{cpu} = c_j^{cpu} - u_j^{cpu}$ |
| Memory | $c_j^{mem}$ | $u_j^{mem}$ | $r_j^{mem} = c_j^{mem} - u_j^{mem}$ |
| Network | $c_j^{net}$ | $u_j^{net}$ | $r_j^{net} = c_j^{net} - u_j^{net}$ |

Herein, the virtual machine scheduler 21c may, for example, find the compute node $CN_j$ (i.e., $d_i^{cpu} \leq r_j^{cpu}$; $d_i^{mem} \leq r_j^{mem}$; $d_i^{net} \leq r_j^{net}$) that satisfies the resource demands of the virtual machine $VM_i$.

Figure 8A:
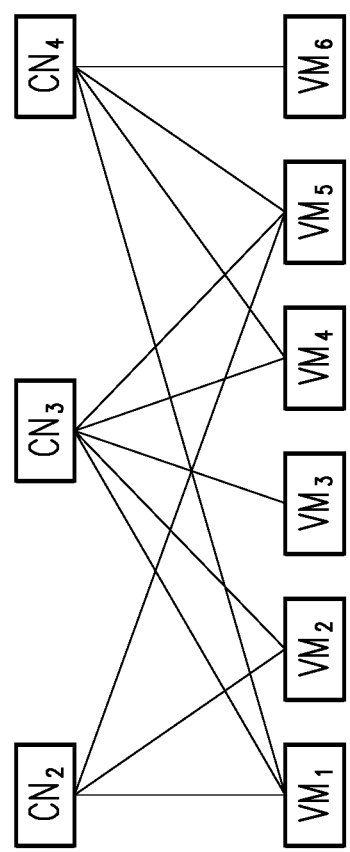
FIG. 8A is a schematic diagram illustrating a resource relation for evacuating the virtual machines to the compute nodes according to an exemplary embodiment of the disclosure.
Figure 8B:
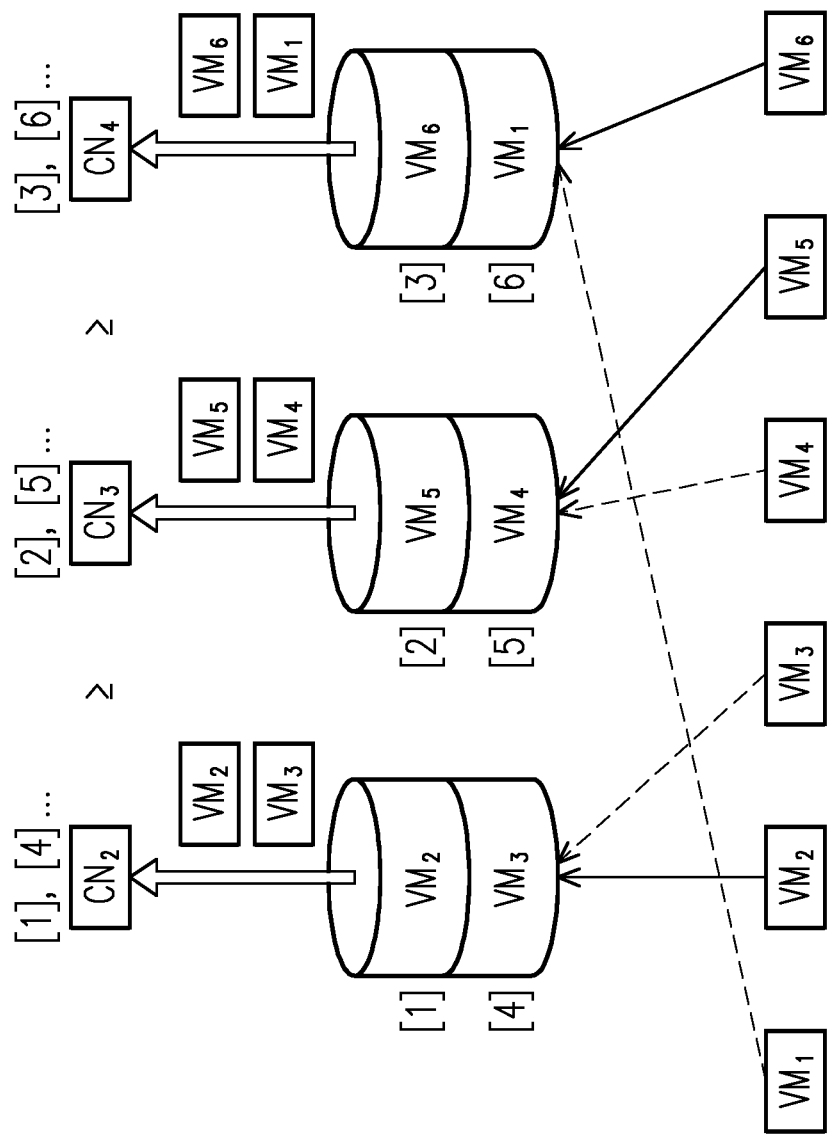
FIG. 8B is a schematic diagram illustrating a batch parallel evacuation strategy of the virtual machines according to an exemplary embodiment of the disclosure.

For instance, FIG. 8A is a schematic diagram illustrating a resource relation for evacuating the virtual machines to the compute nodes according to an exemplary embodiment of the disclosure. FIG. 8B is a schematic diagram illustrating a batch parallel evacuation strategy of the virtual machines according to an exemplary embodiment of the disclosure.

Please refer to FIG. 8A, FIG. 8A adopts a bipartite graph method used to draw a linking line between the compute node $CN_j$ that can satisfy the resource demands of the virtual machine $VM_i$ and the virtual machine $VM_i$; or else, the linking line is not drawn. Here, if $\alpha_{i,j}=1$ is used to represent that the compute node $CN_j$ can satisfy the resource demands of the virtual machine $VM_i$ in terms of CPU/memory/network, as shown by FIG. 8A, $\alpha_{6,2}=0$; $\alpha_{6,3}=0$; $\alpha_{6,4}=1$.

Next, with reference to FIG. 8B, the virtual machine scheduler sorts the compute node $CN_j$ into $CN_2 \geq CN_3 \geq CN_4$ according to amounts of the resource capacity, the usage amount and the available amount of the compute node $CN_j$, and sorts the virtual machine $VM_i$ into $VM_2 \geq VM_5 \geq VM_6 \geq VM_3 \geq VM_4 \geq VM_1$ according to the profits of the virtual machine $VM_i$.

Here, the virtual machine scheduler adopts, for example, a round-based system when assigning the virtual machines. In the first round, for example, the virtual machines $VM_2$, $VM_5$ and $VM_6$ with higher profits are assigned to the compute nodes $CN_2$, $CN_3$ and $CN_4$, respectively, as indicated by [1], [2] and [3] in the drawing. Then, in the next round, the virtual machines $VM_3$, $VM_4$ and $VM_1$ with the second highest profits are assigned to the compute nodes $CN_2$, $CN_3$ and $CN_4$, respectively, as indicated by [4], [5] and [6] in the drawing. By analogy, when the virtual machines that need to be evacuated are all assigned to the compute node or there is no more virtual machine to be chosen, and the virtual machine scheduler then completes the scheduling for the virtual machine evacuation and may start the batch parallel evacuation.

It should be noted that, in the stage where the self-inspection is performed by the self-checker 14, the compute node 10 would maintain one set of the watch list and the blacklist to be stored into the database 26. The compute node health checker 23 on the virtual machine management node 20 would continuously maintain the watch list and the blacklist for the virtual machines with issues.

The compute node health checker 23 may define a resource abnormal standard, including CPU ($x_i^{cpu}$), memory ($x_i^{mem}$) and network ($x_i^{net}$), for each virtual machine $VM_i$ according to application services of different virtual machines. By doing so, each time before performing operations of the virtual machine evacuation, the compute node health checker 23 may verify the usage amount/usage rate of the resources of the virtual machines in the watch list in the database 26. Here, if the usage amount/usage rate of the resources of the virtual machine is abnormal (i.e., exceeds the resource abnormal standard), a suspicion accumulated count of the virtual machine is recorded. When the suspicion accumulated count of the virtual machine exceeds a tolerable value range, that virtual machine is put on the blacklist.

In summary, the compute node, the failure detection method thereof and the cloud data processing system of the disclosure provide a failure management mechanism that can be run on a cloud management system. By designing the multiple inspection mechanism in time and space dimensions, the real status of the compute nodes can be confirmed. Also, with the complete virtual machine evacuation mechanism provided, the virtual machine evacuation of the failed compute node may be implemented.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A compute node failure detection method, adapted to a cloud data processing system having a plurality of compute nodes and at least one management node, the method comprising:
   performing a self-inspection on operating statuses of services being provided and resource usage statuses and reporting an inspection result to the at least one management node by each of the compute nodes;
   dynamically adjusting a time interval of a next report according to the inspection result and informing the management node of the time interval by said compute node; and
   checking a report condition of the inspection result according to the time interval by the at least one management node so as to determine whether said compute node fails.

2. The compute node failure detection method according to claim 1, wherein the step of dynamically adjusting the time interval of the next report according to the inspection result by said compute node comprises:
   determining whether a usage amount or a usage rate of at least one resource among a plurality of resources of said compute node exceeds a usage threshold; and
   shortening the time interval if the usage amount or the usage rate of the at least one resource exceeds the usage threshold.

3. The compute node failure detection method according to claim 1, wherein the step of checking the report condition of the inspection result according to the time interval by the at least one management node so as to determine whether said compute node fails comprises:
   checking whether the inspection result is being received within a report time defined by the time interval;
   accumulating a failure count if the inspection result is not being received; and
   repeating the step of checking, and determining that said compute node fails when the accumulated failure count is greater than a failure threshold.

4. The compute node failure detection method according to claim 1, wherein the management node comprises a virtual machine management node, and the step of checking the report condition of the inspection result according to the time interval by the at least one management node so as to determine whether said compute node fails comprises:
   checking whether the inspection result is being received within a report time defined by the time interval and accumulating a failure count if the inspection result is not being received by the virtual machine management node;
   checking an update performed by said compute node on the operating statuses of services being provided by said compute node in a database and accumulating the failure count if a number of times the database is not updated exceeds a preset number of times by the virtual machine management node; and
   checking a status of a heart-beat connection with said compute node through a heart-beat service and accumulating the failure count when the heart-beat connection is lost by the virtual machine management node; and
   repeating the steps of checking, and determining that said compute node fails when the accumulated failure count is greater than a failure threshold.

5. The compute node failure detection method according to claim 1, wherein the management node comprises a virtual machine management node and a data center management node, and the step of checking the report condition of the inspection result according to the time interval by the at least one management node so as to determine whether said compute node fails comprises:

checking whether a reception of the inspection result is normal within a report time defined by the time interval by the virtual machine management node so as to obtain a first status;

checking whether an update performed by said compute node on the operating statuses of services being provided by said compute node in a database is normal by the virtual machine management node so as to obtain a second status;

checking whether a heart-beat connection with said compute node is normal through a heart-beat service by the virtual machine management node so as to obtain a third status;

checking whether the reception on the inspection result is normal within the report time defined by the time interval by the data center management node so as to obtain a fourth status;

checking whether the operating statuses of services of said compute node are normal by the data center management node connected to said compute node so as to obtain a fifth status, wherein a failure count is accumulated when the first, the second, the fourth and the fifth statuses are abnormal, the third status is normal and a compute service falling into a restart loop is confirmed, the failure count is accumulated when the first, the second, the third and the fourth statuses are abnormal, and the failure count is accumulated when the first, the second, the third and the fifth statuses are abnormal, the fourth status is normal and the compute service fails to be restarted, or when the first, the second and the fourth statuses are abnormal, the third status is normal and the compute service fails to be restarted; and repeating the steps of checking, and determining that said compute node fails when the accumulated failure count is greater than a failure threshold.

6. The compute node failure detection method according to claim 1, further comprising:

comparing a usage amount or a usage rate of resources of at least one virtual machine running on said compute node with a predefined virtual machine resource specification according to the resource usage statuses by the management node so as to determine whether the usage amount or the usage rate of resources exceeds a preset value or a preset ratio; and if the usage amount or the usage rate of resources exceeds the preset value or the preset ratio or a number of times the usage amount or the usage rate of resources exceeds the preset value or a number of the preset ratio exceeds a preset number, putting the at least one virtual machine corresponding to the usage amount and the usage rate of resources on a blacklist wherein the virtual machine put on the blacklist is prohibited from being evacuated to other compute nodes.

7. The compute node failure detection method according to claim 1, wherein after the step of determining whether said compute node fails, the method further comprises:

performing an evacuation on at least one virtual machine running on said compute node to other compute nodes if determining that said compute node fails.

8. The compute node failure detection method according to claim 7, wherein the step of performing the evacuation on the at least one virtual machine running on said compute node to the other compute nodes comprises:

selecting a plurality of compute nodes with more available resources among the other compute nodes for sequentially assigning a plurality of virtual machines with satisfiable resource demands and higher profits, wherein the profits refers to a ratio of a profit guaranteed by the selected compute nodes for satisfying each of the virtual machines to a resource cost consumed by the selected compute nodes for running each of the virtual machines.

9. A cloud data processing system, comprising:

a plurality of compute nodes, each of the compute nodes comprises a self-checker, performing a self-inspection on operating statuses of services being provided and resource usage statuses in order to report an inspection result, and dynamically adjusting a time interval for reporting the inspection result according to the inspection result; and at least one management node, the at least one management node comprises receiving the inspection result reported and the time interval informed by each of the compute nodes, and checking a report condition of the inspection result reported by corresponding said compute node so as to determine whether corresponding said compute node fails.

10. The cloud data processing system according to claim 9, wherein the self-checker of each of the compute nodes comprises determining whether a usage amount or a usage rate of at least one resource among a plurality of resources exceeds a usage threshold, and shortening the time interval when the usage amount or the usage rate of the at least one resource exceeds the usage threshold.

11. The cloud data processing system according to claim 9, wherein the management node comprises checking whether the inspection result is being received within a report time defined by the time interval, accumulating a failure count if the inspection result is not being received, and determining that corresponding said compute node fails when the accumulated failure count is greater than a failure threshold.

12. The cloud data processing system according to claim 9, wherein the management node comprises:

a virtual machine management node, comprising:

a database, storing virtual machine information;

a first inspection receiver, checking whether the inspection result is being received within a report time defined by the time interval and accumulating a failure count if the inspection result is not being received;

a compute node health checker, checking an update performed by a compute server of a compute node on the operating statuses of services being provided by the compute node, and accumulating the failure count if a number of times the database is not updated exceeds a preset number; and a heart-beat server, checking a status of a heart-beat connection with the compute node through a heart-beat service, and accumulating the failure count when the heart-beat connection is lost, wherein the first inspection receiver comprises determining that the compute node fails when the accumulated failure count is greater than a failure threshold.

13. The cloud data processing system according to claim 9, wherein the management node comprises:
- a virtual machine management node, comprising:
  - a database, storing virtual machine information;
  - a first inspection receiver, checking whether a reception of the inspection result is normal within a report time defined by the time interval so as to obtain a first status;
  - a compute node health checker, checking whether an update performed by a compute server of a compute node on the operating statuses of services being provided by the compute node in the database is normal so as to obtain a second status; and
  - a heart-beat server, checking whether a heart-beat connection with the compute node is normal through a heart-beat service so as to obtain a third status; and
- a data center management node, comprising:
  - a second inspection receiver, checking whether the reception of the inspection result is normal within the report time defined by the time interval so as to obtain a fourth status; and
  - a service monitor, connected to the compute node for checking whether the operating statuses of services of the compute node are normal so as to obtain a fifth status, wherein the service monitor accumulates a failure count when the first, the second, the fourth and the fifth statuses are abnormal, the third status is normal and the service monitor confirms that a compute service falls into a restart loop, the service monitor accumulates the failure count when the first, the second, the third and the fourth statuses are abnormal, and the service monitor accumulates the failure count when the first, the second, the third and the fifth statuses are abnormal, the fourth status is normal and the service monitor confirms that the compute service fails to be restarted, or when the first, the second and the fourth statuses are abnormal, the third status is normal and the service monitor confirms that the compute service fails to be restarted, and determines that the compute node fails when the accumulated failure count is greater than a failure threshold.

14. The cloud data processing system according to claim 13, wherein the first inspection receiver further compares a usage amount or a usage rate of resources of at least one virtual machine running on the compute node with a predefined virtual machine resource specification according to the resource usage statuses so as to determine whether the usage amount or the usage rate of resources exceeds a preset value or a preset ratio, wherein
- if the usage amount or the usage rate of resources exceeds the preset value or the preset ratio or a number of times the usage amount or the usage rate of resources exceeds the preset value or a number of the preset ratio exceeds a preset number, the first inspection receiver further puts the at least one virtual machine corresponding to the usage amount or the usage rate of resources on a blacklist so as to prohibit the virtual machine from being evacuated to the other compute nodes.

15. The cloud data processing system according to claim 13, wherein the virtual machine management node further comprises:
- a virtual machine scheduler, performing an evacuation on at least one virtual machine running on the compute node to the other compute nodes when the service monitor determines that the compute node fails.

16. The cloud data processing system according to claim 15, wherein the virtual machine scheduler comprises selecting a plurality of compute nodes with more available resources among the other compute nodes for sequentially assigning a plurality of virtual machines with satisfiable resource demands and higher profits, wherein the profits refers to a ratio of a profit guaranteed by the selected compute node for satisfying each of the virtual machines to a resource cost consumed by the selected compute node for each running of the virtual machines.

17. A compute node, comprising:
- a self-checker, performing a self-inspection on operating statuses of services being provided and resource usage statuses, and reporting an inspection result to at least one management node, and dynamically adjusting a time interval for reporting the inspection result according to the inspection result and informing the management node of the time interval, wherein
- the at least one management node checks a report condition of the inspection result according to the time interval so as to determine whether the compute node fails.

18. The compute node according to claim 17, wherein the self-checker comprises determining whether a usage amount or a usage rate of at least one resource among a plurality of resources of the compute node exceeds a usage threshold, and shortening the time interval when the usage amount or the usage rate of the at least one resource exceeds the usage threshold.

19. The compute node according to claim 17, further comprising:
- a heart-beat server, transmitting a heart-beat packet to the management node through a heart-beat service for allowing the management node to determine a status of a heart-beat connection and accordingly determine whether the compute node fails.

20. The compute node according to claim 17, further comprising:
- a compute server, connected to a service monitor of the management node for allowing the service monitor to determine whether the operating statuses of services are normal and accordingly determine whether the compute node fails.

* * * * *